W. DALE, Dec'd.

DALE TILE MANUFACTURING COMPANY, (Limited,) Assignee.

COVER FOR OPENINGS IN SIDEWALKS.

No. 10,146. Reissued July 4, 1882.

Witnesses:
James H. Hunter.
E. S. Mailler.

Inventor:
Dale Tile Manufacturing Co (Limited)
By Chas E. Furman Pres

UNITED STATES PATENT OFFICE.

DALE TILE MANUFACTURING COMPANY, (LIMITED,) OF NEW YORK, N. Y., ASSIGNEE OF WILLIAM DALE, DECEASED.

COVER FOR OPENINGS IN SIDEWALKS.

SPECIFICATION forming part of Reissued Letters Patent No. 10,146, dated July 4, 1882.

Original No. 112,428, dated March 7, 1871. Application for reissue filed June 6, 1882.

*To all whom it may concern:*

Be it known that WILLIAM DALE, late of the city, county, and State of New York, did invent a certain Improvement in Covers for Openings in Sidewalks, of which the following is a full, clear, and exact description, reference being had to the annexed drawings, making part of this specification, in which—

Figure 1:
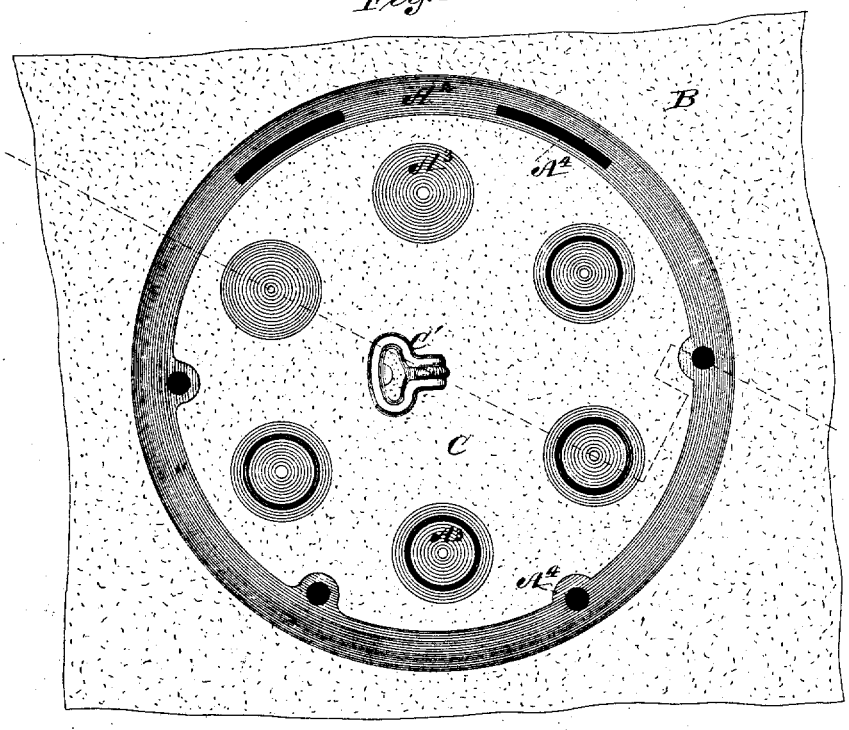
Figure 2:
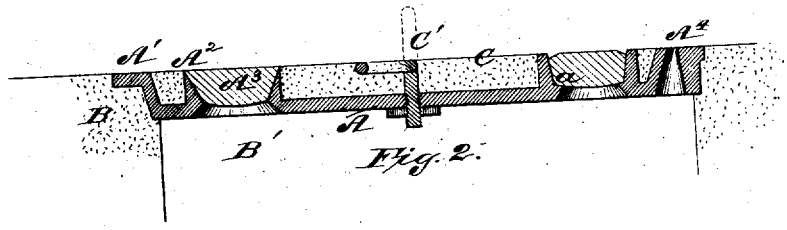

Figure 1 is a plan view of said improved vault-cover. Fig. 2 is a vertical section on line *x x*, Fig. 1.

The same letters are used in both figures in the designation of identical parts.

This invention relates to vault-covers; and the improvement consists, first, in producing as a new article of manufacture, a vault-cover composed of a metallic dish having bull's-eyes for the admission of light into the cellar or vault below, and a wooden block or other non-slippery material for filling the cavities in the dish around the bull's-eyes; and, secondly, in constructing the dish with slots or perforations around its edge for ventilating purposes.

To enable those skilled in the art to make and use the invention, the following description of its construction and operation is given.

In the annexed drawings, A represents the metallic dish, which may be made of the circular form shown or any other to adapt it to that of the opening which it is designed to cover. It rests, by a horizontal flange, A′, around its top, upon a shelf or seat formed in the pavement B surrounding the opening B′, and may be fastened from below by any suitable mechanism. It is set into the pavement so that its upper surface is flush with the latter. The bottom of the dish is constructed with a series of openings, surrounded by upwardly-projecting flanges $A^2$, with annular shoulders *a*. These openings are covered by thick pieces of glass or bull's-eyes $A^3$, which rest upon the shoulders *a* and are secured in the annular flanges in any suitable manner, their upper surfaces being flush with the edges of the flanges A′ and $A^2$. The space of the cavity in the dish not occupied by the bull's-eyes and their surrounding flanges is filled by a non-slippery material. When convenient, it may be filled with a material like that of which the pavement is composed. In most cases, however, a block of wood of the size of the cavity, with holes bored through for the reception of the bull's-eyes, is preferred. This block of wood C is fastened to the dish by means of a ring-bolt, C′, and nut, in the manner shown, said ring-bolt serving also as a handle, by which the cover may be lifted off its seat to uncover the opening. When not in use the ring of the bolt is turned down into a gutter in the wooden block, so that the cover may present an unbroken upper surface flush with the pavement.

Several slots or holes, $A^4$, are formed in the dish around or near its outer edge, outside of the wooden block, sufficiently small to prevent the rain from entering through them to any objectionable extent, yet sufficiently large to afford a means of ventilation for the cellar or vault below. These openings may be made flaring from top to bottom, as shown in Fig. 2.

What is claimed as the invention of the said DALE is—

1. The combination of the metallic dish A A′, bull's-eyes $A^3$, and wooden block C, or other non-slippery material, used as a filling for the cavity of the dish between and around the bull's-eyes, substantially as set forth.

2. In combination with the vault-cover composed of the parts A $A^3$ C, the openings $A^4$ near the periphery of the dish A and surrounding the non-slippery filling C, substantially as and for the purpose set forth.

DALE TILE MANUFACTURING CO., (LIMITED.)
By CHAS. E. FURMAN,
*Prest.*

Witnesses:
JAMES H. HUNTER,
E. S. MAILLER.